(12) United States Patent
Oda et al.

(10) Patent No.: US 7,731,926 B2
(45) Date of Patent: Jun. 8, 2010

(54) WET FLUE-GAS DESULFURIZATION APPARATUS AND METHOD OF WET FLUE-GAS DESULFURIZATION

(75) Inventors: Naoki Oda, Hiroshima (JP); Takanori Nakamoto, Hiroshima (JP); Hiroyuki Nosaka, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 129 days.

(21) Appl. No.: 12/092,787

(22) PCT Filed: Sep. 20, 2006

(86) PCT No.: PCT/JP2006/318595

§ 371 (c)(1),
(2), (4) Date: May 6, 2008

(87) PCT Pub. No.: WO2007/066443

PCT Pub. Date: Jun. 14, 2007

(65) Prior Publication Data

US 2009/0263305 A1    Oct. 22, 2009

(30) Foreign Application Priority Data

Dec. 7, 2005    (JP) .............................. 2005-353164

(51) Int. Cl.
*B01D 53/50* (2006.01)
*B01D 53/77* (2006.01)

(52) U.S. Cl. ................................. 423/243.01; 422/168

(58) Field of Classification Search ............ 423/243.01; 422/168

See application file for complete search history.

(56) References Cited

U.S. PATENT DOCUMENTS 5,429,808 A * 7/1995 Kuroda et al. ............... 422/176
6,041,272 A * 3/2000 Michiki et al. ............. 700/266

FOREIGN PATENT DOCUMENTS

| JP | 5-317642 | 12/1993 |
| JP | 8-000949 | 1/1996 |
| JP | 2000-317259 | 11/2000 |
| JP | 2001-120946 | 5/2001 |

OTHER PUBLICATIONS

English language Abstract JP 5-317642, dated Dec. 3, 1993.
English language Abstract JP 8-000949, dated Jan. 9, 1996.
English language Abstract JP 2001-120946, dated May 8, 2001.
English language Abstract JP 2000-317259, dated Nov. 21, 2000.

* cited by examiner

*Primary Examiner*—Timothy C Vanoy
(74) *Attorney, Agent, or Firm*—Greenblum & Bernstein, P.L.C.

(57) ABSTRACT

Flue gas of boiler is introduced through gas inlet part of flue-gas desulfurization apparatus, and absorbent liquid sprayed from spray nozzle is trapped in recirculation tank. There, agitation is performed by oxidation agitator to thereby oxidize $SO_2$ absorbed from the flue gas into gypsum. In the tank, oxidation air is fed from posterior air pipe and anterior air pipe behind and ahead of liquid propulsion by the propeller. Thus, even when the amount of oxidation air must be increased in accordance with an increase of boiler load, the oxidation efficiency can be enhanced without increasing the number of agitators. Then the apparatus with which even when the amount of oxidation air fed to the liquid trapping section is increased, highly efficient oxidation can be performed without increasing the number of agitators installed and the operating cost.

6 Claims, 5 Drawing Sheets

F I G. 1
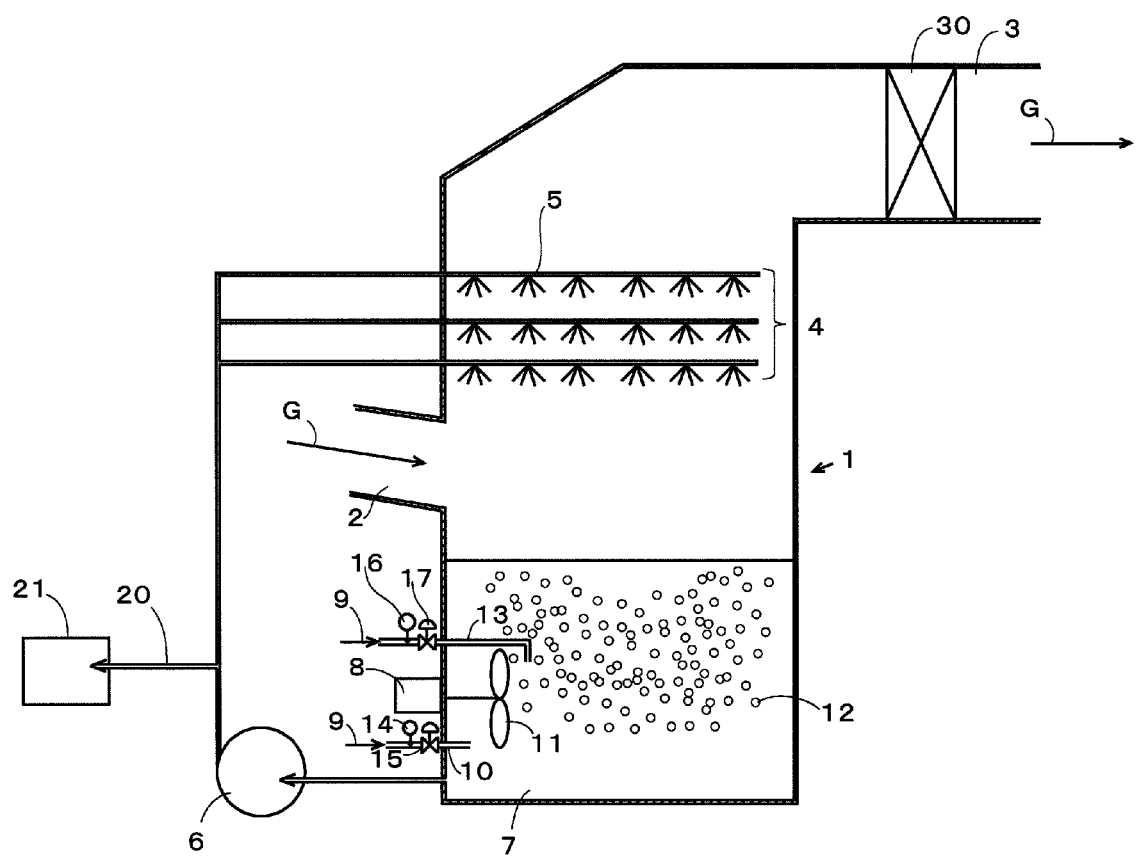

F I G. 3
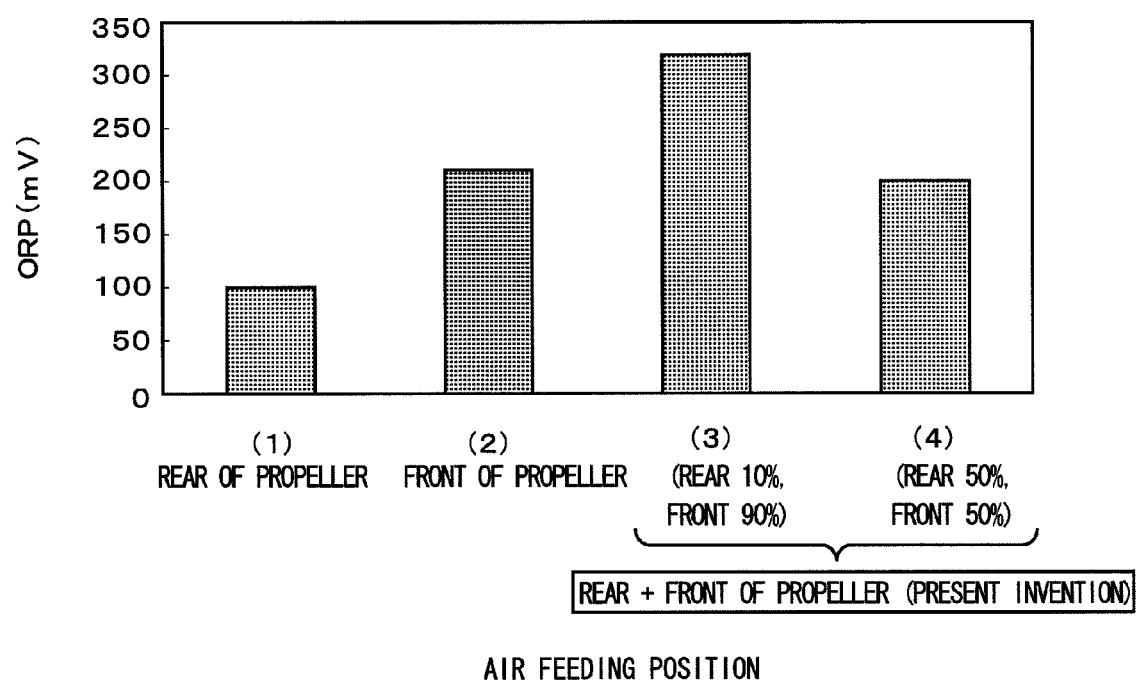

120946).

WET FLUE-GAS DESULFURIZATION APPARATUS AND METHOD OF WET FLUE-GAS DESULFURIZATION

TECHNICAL FIELD

The present invention relates to a flue-gas desulfurization system and a recirculation tank section having a step of neutralizing/oxidizing a sulfur oxide (hereinafter, sometimes referred to as $SO_2$) absorbed in an absorber recirculation tank section thereof, and particularly relates to a method for feeding oxidation air for oxidizing absorbed $SO_2$.

BACKGROUND ART

In recent years, the natural environment surrounding the earth has significantly deteriorated. Above all, in thermal power plants and the like located around the world, $SO_2$ and soot and dust in flue gases generated as a result of combustion of fossil fuels are one of the main causes of environmental problems such as air pollution, and it has become mainstream to install a wet flue-gas desulfurization system for treatment of the flue gases.

Particularly recently, reductions in the concentration of emission values of $SO_2$ and soot and dust in flue gases have been demanded, while the inlet $SO_2$ concentration has increased due to diversification of boiler fuels and the like, and thus there is a pressing need to develop a high-performance flue-gas desulfurization system.

An example of a flue-gas desulfurization system of a conventional art is shown in FIG. 4 and FIG. 5. The flue-gas desulfurization system is constructed mainly with an absorber shell 1, a gas inlet port 2, a gas outlet port 3, an absorbent liquid spray section 4, a spray nozzle 5, a recirculation pump 6, a recirculation tank section 7, an oxidation agitator 8, a posterior air pipe 10, a propeller 11, a gypsum slurry bleed pipe 20, a gypsum dewatering system 21, and a mist eliminator section 30.

A flue gas G from a boiler is introduced through the gas inlet port 2 and makes gas-liquid contact with an absorbent liquid sprayed from the spray nozzle 5 of the absorbent liquid spray section 4 to thereby become a clean gas, and is emitted through the gas outlet port 3 after accompanying mist is removed therefrom by the mist eliminator section 30.

Moreover, the absorbent liquid brought in gas-liquid contact falls in the absorber shell 1 and is stored into the recirculation tank section 7. In the recirculation tank section 7, air 9 to be fed is atomized into a large amount of fine bubbles by the propeller 11 that rotates in conjunction with the oxidation agitator 8, and oxygen in the air dissolves in the absorbent liquid. In the recirculation tank section 7, calcium sulfite is produced by a neutralization reaction between absorbed $SO_2$ and calcium carbonate that is fed to the recirculation tank section 7 by an unillustrated calcium carbonate feeding system, and the calcium sulfite is oxidized by oxygen dissolved in the absorbent liquid to produce gypsum. The absorbent liquid in the recirculation tank section 7 where gypsum exists as slurry is sent again to the spray nozzle 5 by the recirculation pump 6, is partly sent to the gypsum dewatering system 21 through the gypsum slurry bleed pipe 20, and is therein separated into solid gypsum and water.

In the abovementioned conventional art, the oxidation air 9 is fed from the posterior air pipe 10 with a feed port, which is at the rear of the propeller 11 of the agitator 8, to the recirculation tank section 7 as shown in FIG. 5. This is a mode of increasing the air utilization rate by atomizing, by a shearing force generated by a rotation of the propeller 11, the oxidation air 9 fed to the recirculation tank section 7 into a large amount of fine bubbles to thereby increase a gas-liquid contact area with the absorbent liquid (Japanese Published Unexamined Patent Application No. 2001-120946).

Moreover, there is a method for feeding air to the front of the agitator propeller 11 (Japanese Published Unexamined Patent Application No. H08-949, Japanese Published Unexamined Patent Application No. 2000-317259). In this method, employed is a mode of making air accompany a discharge flow of the absorbent liquid resulting from a rotation of the propeller 11 to thereby uniformly disperse air bubbles in the recirculation tank section while atomizing the same to fine bubbles.

DISCLOSURE OF THE INVENTION

Problems to be Solved by the Invention

Of the abovementioned conventional arts, the mode of feeding the oxidation air 9 from the posterior air pipe 10 with a feed port at the rear of the propeller 11 of the agitator 8 to the recirculation tank section 7 shown in FIG. 5 may not sufficiently cope with a case where a flue gas with a high $SO_2$ concentration is treated due to diversification of boiler fuels and the like in recent years. More specifically, when a flue gas with a high $SO_2$ concentration is treated, the amount of calcium sulfite ($Ca(HSO_3)_2$) in the absorbent liquid increases, and therewith the amount of oxidation air to be fed also increases. However, there is a limit to the amount of oxidation air that can be fed per one agitator, and the amount of a discharge flow resulting from a rotation of the propeller 11 is reduced when air of an amount larger than the limit value is fed, which results in a state of the propeller 11 idly rotating in the air 9, so that air bubbles 12 are not atomized to fine bubbles, the gas-liquid contact area with the absorbent liquid is reduced, and the oxidation efficiency is lowered.

Moreover, of the abovementioned conventional arts, the mode of feeding air into the absorbent liquid at the front of the agitator propeller 11 allows uniformly dispersing oxidation air bubbles in the recirculation tank section 7 while atomizing the same to fine bubbles, however, since the air itself to be fed to the front of the propeller 11 does not contact the rotating propeller 11, the size of fine air bubbles is larger than that by the method for feeding air to the rear of the propeller 11, and thus the contact area with the absorbent liquid is reduced, so that the oxidation efficiency is lowered. However, since the air itself to be fed to the front of the propeller 11 is made to directly accompany a discharge flow generated by a rotation of the propeller 11, there is an advantage that the air bubble dispersion distance in the recirculation tank section 7 is increased, the retention time is increased, and thus air bubbles are easily uniformly dispersed.

As described above, due to diversification of boiler fuels and the like in recent years, the amount of $SO_2$ that should be removed has tended to increase in a flue gas, and therewith the amount of oxidation air has also increased. As there is a limit to the amount of oxidation air that can be fed per one agitator 8, the amount of a discharge flow resulting from a rotation of the propeller 11 is reduced when air of an amount larger than the limit is fed, which results in a state of the propeller 11 idly rotating in the fed air 9, so that air bubbles 12 are not atomized to fine bubbles, the gas-liquid contact area between the oxidation air bubbles 12 and the absorbent liquid is reduced, and the oxidation efficiency of $SO_2$ is lowered.

Moreover, the agitator 8 often performs, simultaneously with atomization of the oxidation air 9, agitation for preventing settlement of solids in an absorbent liquid slurry in the recirculation tank section 7, and if the amount of a discharge flow from the propeller 11 is reduced by an increase in the amount of oxidation air, solids in the absorbent liquid slurry also settle at the bottom of the recirculation tank section 7, and this causes an inconvenience in operation of the plant, such as clogging of the pipes.

Therefore, conventionally, with an increase in the amount of oxidation air to be fed to the recirculation tank section 7, the number of agitators 8 installed has been increased, and this has caused an increase in the equipment cost and an increase in the maintenance cost of a user. Moreover, there are means for coping with an increase in the amount of oxidation air, with the same number of agitators 8 installed, by increasing the diameter of the blades of the propeller 11 or increasing the number of rotations of the propeller 11, however, in both of these cases, power consumption, that is, the operating cost is increased by an increase in power of the agitator 8.

It is therefore an object of the present invention to provide a wet flue-gas desulfurization system and method with which even when the amount of oxidation air to be fed to the recirculation tank section is increased, highly efficient oxidation can be performed without increasing the number of agitators installed and the operating cost.

Means for Solving the Problems

The abovementioned object can be achieved by the following solution means.

A first aspect of the invention provides a wet flue-gas desulfurization system including: an absorber shell including a flue gas inlet port through which a flue gas containing a sulfur oxide and soot and dust emitted from a combustion system such as a boiler is introduced and an absorbent liquid spray section provided at a higher portion than the flue gas inlet port; and a recirculation tank section which stores an absorbent liquid that has absorbed a sulfur oxide in a flue gas and includes an agitator including a propeller to agitate the absorbent liquid, an air feeding means which injects oxidation air into a vicinity of the propeller, and an absorbent liquid circulating means which bleeds the absorbent liquid after an oxidation reaction by air and a neutralization reaction by alkali and circulatively feeds the absorbent liquid to the absorbent liquid spray section of the absorber shell, wherein the air feeding means is a means for feeding oxidation air to the absorbent liquid in the recirculation tank section at the rear and front of a liquid discharge by the propeller of the agitator.

Here, for the rear and front of a liquid discharge by the propeller, the front of a liquid discharge by the propeller denotes a direction in which the absorbent liquid in the recirculation tank section is discharged by a propeller for which the direction of a liquid discharge has been previously determined, and the rear of a liquid discharge by the propeller denotes a direction opposite the direction in which the absorbent liquid is discharged.

A second aspect of the invention provides the wet flue-gas desulfurization system according to the first aspect, wherein, on the air feeding means, provided is a means for adjusting a ratio of the amount of air to be fed to the rear and front of a liquid discharge by the propeller of the agitator.

A third aspect of the invention provides the wet flue-gas desulfurization system according to the first or second aspect, wherein an air injection port of the air feeding means to be installed at the front of a liquid discharge by the propeller of the agitator is arranged at a position lower than an extended line of a horizontal central axis of the propeller.

A fourth aspect of the invention provides a method for wet flue-gas desulfurization in which a ratio of the amount of air to be fed, by use of the wet flue-gas desulfurization system according to any one of the first to third aspects, to the rear and front of a liquid discharge by the propeller of the agitator, from the air feeding means that feeds oxidation air to the absorbent liquid in the recirculation tank section at the rear and front of a liquid discharge by the propeller of the agitator, is higher at the front of a liquid discharge than at the rear of a liquid discharge.

A fifth aspect of the invention provides the method for wet flue-gas desulfurization according to the fourth aspect, wherein, of a required amount of air, a ratio of the amount of air to be fed to the rear and front of a liquid discharge by the propeller of the agitator is 10% at the rear of a liquid discharge and 90% at the front of a liquid discharge.

A sixth aspect of the invention provides the method for wet flue-gas desulfurization according to the fourth aspect, wherein when the oxidation air to be fed to the air feeding means is changed in amount, of a required amount of air, an amount of air to be fed to the rear of a liquid discharge by the propeller of the agitator is kept constant, and an amount of air to be fed to the front of a liquid discharge by the propeller of the agitator is changed.

In the present invention, by feeding oxidation air to the front of a liquid discharge (hereinafter, simply referred to as "front") and the rear of a liquid discharge (hereinafter, simply referred to as "rear") by the agitator propeller, air bubbles are atomized to fine bubbles by a shearing force generated by a rotation of the propeller for the air fed from the rear of the propeller, and the air fed from the front of the propeller is made to directly accompany a discharge flow generated by a rotation of the propeller to increase the air bubble dispersion distance, so that the retention time is increased. By thus making full use of both characteristics of feeding oxidation air to the front and rear of the agitator propeller, even when the amount of oxidation air is increased, oxidation efficiency can be improved without increasing the number of agitators installed.

On the other hand, in Japanese Unexamined Patent Application No. H05-317642 and Japanese Unexamined Patent Application No. S59-13624 of the conventional arts, disclosed is a mode of feeding oxidation air into an absorbent liquid of a recirculation tank section, across the front and rear in a liquid discharge direction of an agitator propeller, from above and below thereof.

In these conventional arts, most of the oxidation air does not receive an effect of a shearing force by an agitator and is thus not atomized to fine bubbles in comparison to the present invention, so that oxidation efficiency is deteriorated, and it is necessary to increase the power of an air blower by an increase in the amount of air and to increase the number of oxidation agitators installed.

According to the first aspect of the invention, since air bubbles can be atomized to fine bubbles and the air bubbles can be uniformly dispersed in the recirculation tank section even when the amount of oxidation air is increased, it is possible to improve oxidation efficiency without increasing the number of agitators installed.

According to the second aspect of the invention, in addition to the effect according to the first aspect of the invention, adjusting the ratio of the amount of air to be fed to the rear and front of the propeller makes it possible to cope with a change in boiler load.

According to the third aspect of the invention, in addition to the effect according to the first or second aspect of the invention, due to a characteristic that the liquid is discharged by a rotation of the propeller, a lower side of the propeller is faster in discharge flow speed and more easily forms a flow up to almost the center of the recirculation tank section, and thus the air bubbles are easily dispersed in the absorbent liquid of the recirculation tank section and the retention time is increased, and therefore, oxidation efficiency of $SO_2$ in the absorbent liquid is improved.

According to the fourth aspect of the invention, both effects of atomizing air to fine bubbles to be fed from the front of the propeller and an increase in the retention time improve oxidation efficiency of $SO_2$ in the absorbent liquid.

According to the fifth aspect of the invention, in addition to the effect according to the fourth aspect of the invention, since the amount of air to be fed from the rear of the propeller is small, decline in the force of a liquid discharge by the propeller is slight, and thus the dispersion distance of the air bubbles made to accompany the liquid and the retention time in the recirculation tank section are reduced little, and therefore, oxidation efficiency of $SO_2$ in the absorbent liquid is improved.

According to the sixth aspect of the invention, in addition to the effect according to the fourth aspect of the invention, air to be fed from the rear of the propeller of the agitator is atomized to fine bubbles by a shearing force resulting from a rotation of the propeller, and since this air is constant, there is an effect that a constant air bubble dispersion distance and retention time in the recirculation tank section can be maintained also for air to be fed to the front of the propeller.

BRIEF DESCRIPTION OF THE DRAWINGS

FIG. 1 is a sectional side view of a flue-gas desulfurization system of an example of the present invention.

FIG. 3 is a chart of comparison in the amount of air required for oxidation of calcium sulfite between desulfurization systems of the present invention and a conventional art.

BEST MODE FOR CARRYING OUT THE INVENTION

Hereinafter, a concrete example of the present invention will be described by use of the drawings.

Figure 2:
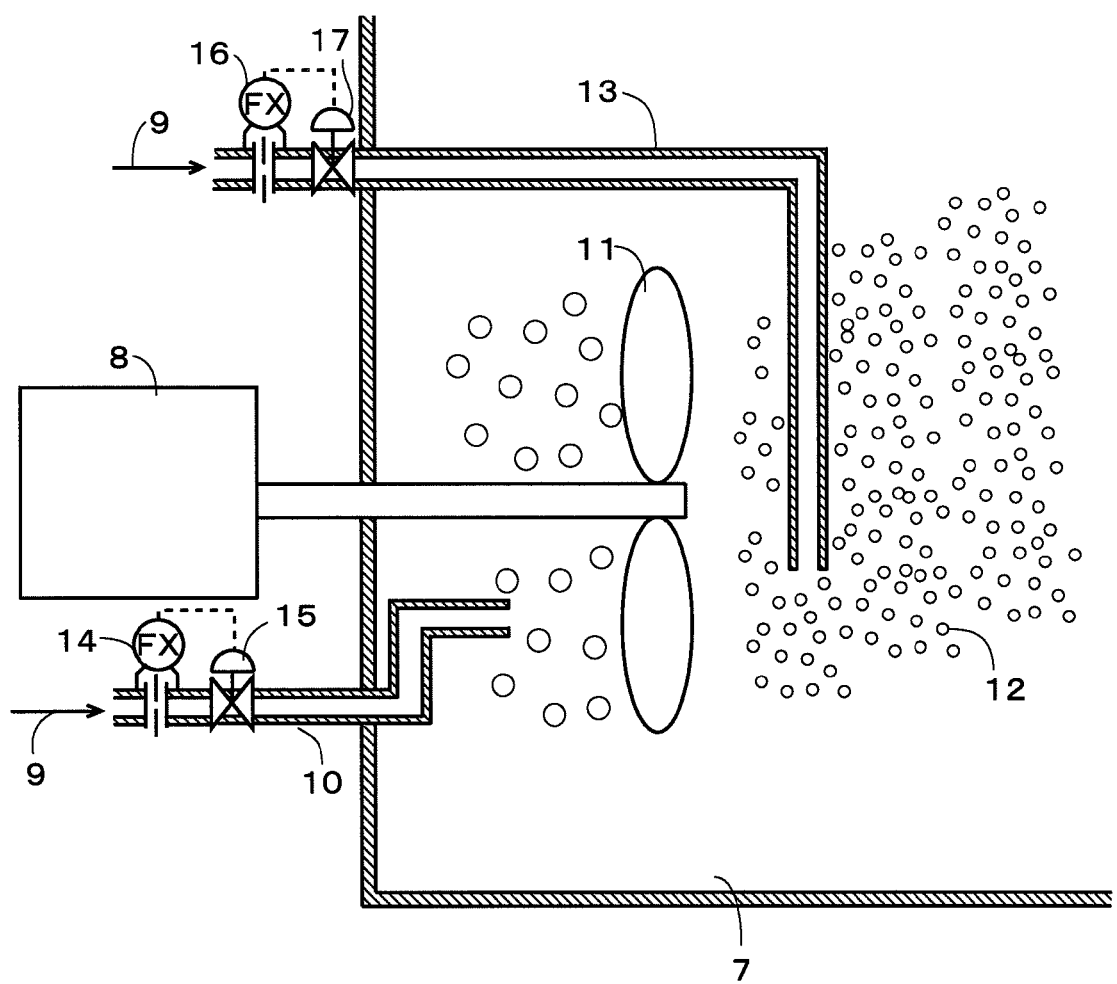
FIG. 2 is an enlarged sectional side view of a recirculation tank section of the flue-gas desulfurization system in FIG. 1.
Figure 4:
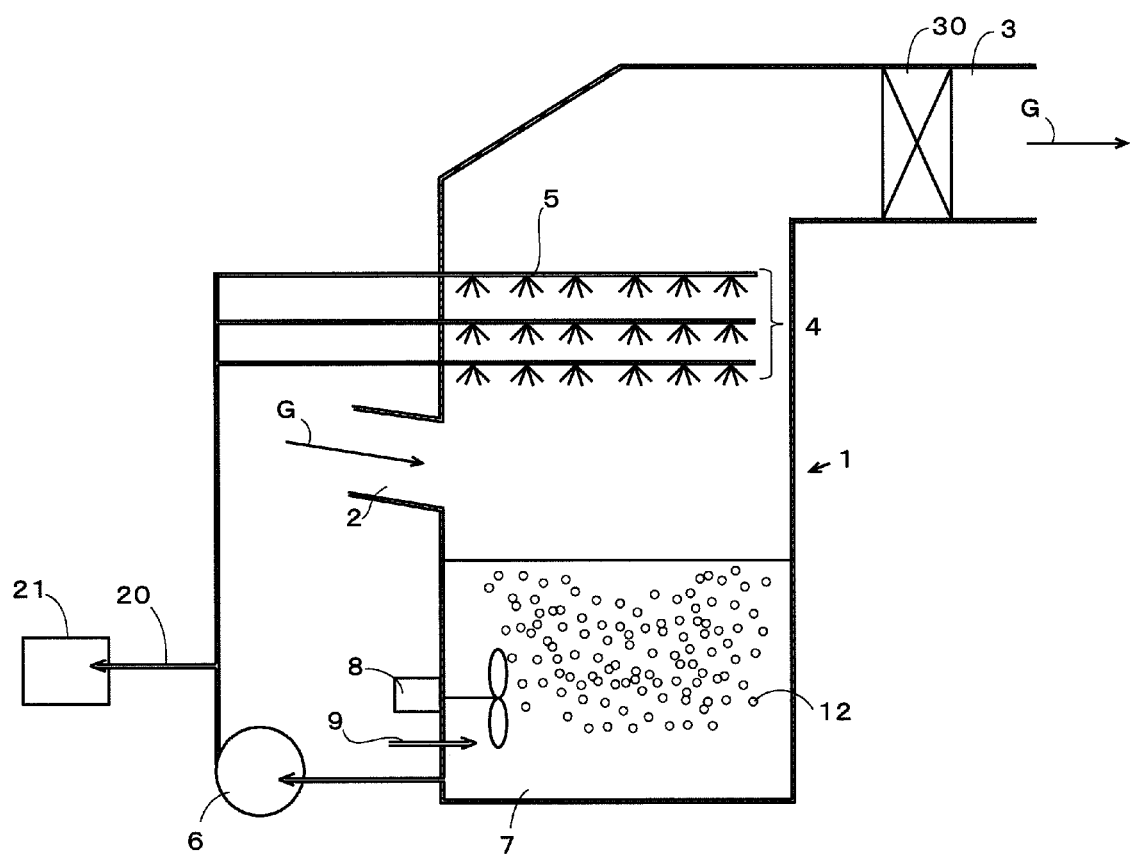
FIG. 4 is a sectional side view of a flue-gas desulfurization system of the conventional art.
Figure 5:
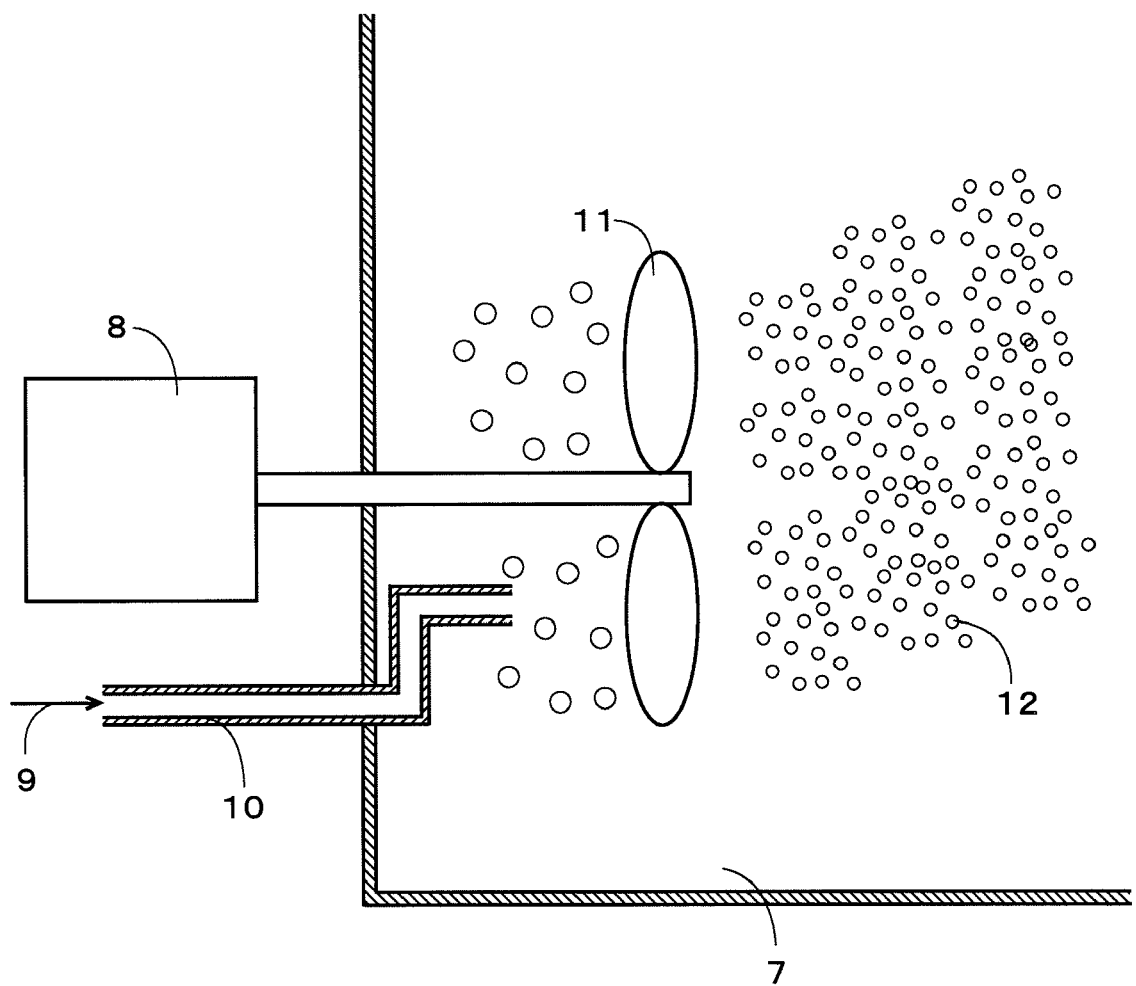
FIG. 5 is an enlarged sectional side view of a recirculation tank section of an embodiment of the conventional art.

FIG. 1 is a sectional side view of a wet flue-gas desulfurization system according to a concrete example of the present invention. FIG. 2 is an enlarged sectional view of a recirculation tank section of the wet flue-gas desulfurization system in FIG. 1. In FIG. 1 and FIG. 2, the flue-gas desulfurization system is constructed mainly with an absorber shell 1, a gas inlet port 2, a gas outlet port 3, an absorbent liquid spray section 4, a spray nozzle 5, a recirculation pump 6, a recirculation tank section 7, an oxidation agitator 8, a posterior air pipe 10, a propeller 11, an anterior air pipe 13, a gypsum slurry bleed pipe 20, a gypsum dewatering system 21, and a mist eliminator section 30.

A flue gas G of a boiler is introduced through the gas inlet port 2 and makes gas-liquid contact with an absorbent liquid sprayed from the spray nozzle 5 of the absorbent liquid spray section 4 to thereby become a clean gas, and is emitted through the gas outlet port 3 after accompanying mist is removed therefrom by the mist eliminator section 30. Moreover, the absorbent liquid brought in gas-liquid contact falls in the absorber shell 1 and is stored into the recirculation tank section 7.

In the recirculation tank section 7, air 9 that is fed by the posterior air pipe 10 and the anterior air pipe 13 is atomized into a large amount of fine bubbles by the propeller 11 that rotates in conjunction with the oxidation agitator 8 to become air bubbles 12, and oxygen in the air bubbles 12 dissolves in the absorbent liquid. In the recirculation tank section 7, calcium sulfite is produced by a neutralization reaction between absorbed $SO_2$ and calcium carbonate that is fed to the recirculation tank section 7 by an unillustrated calcium carbonate feeding system, and the calcium sulfite is oxidized by oxygen dissolved in the absorbent liquid to produce gypsum. The absorbent liquid in the recirculation tank section 7 where gypsum exists as slurry is sent again to the spray nozzle 5 by the recirculation pump 6, is partly sent to the gypsum dewatering system 21 through the gypsum slurry bleed pipe 20, and is therein separated into solid gypsum and water.

In such a structure, it suffices that the posterior air pipe 10 can be arranged at a position which allows feeding air 9 within the range of a blade diameter of the propeller 11, while an outlet of the anterior air pipe 13 is preferably arranged at a position which allows feeding air 9 to a position slightly lower than being on a horizontal extended line of a central axis of rotation of the propeller 11 within the range of a blade diameter of the propeller 11. This is because, due to a characteristic that the liquid is discharged by a rotation of the propeller 11 of the agitator 8, a lower side of the propeller 11 is faster in discharge flow speed and more easily forms a flow up to almost the center of the recirculation tank section 7, and thus the air bubbles 12 are easily dispersed in the absorbent liquid of the recirculation tank section 7 and the retention time is increased.

Moreover, with regard to the amount of air to be fed to the recirculation tank section 7 from the posterior air pipe 10 and the anterior air pipe 13 as in the above, a constant amount of air is basically fed irrespective of a change in load of the boiler, while when the amount of air is changed with a change in boiler load, by changing the amount of air to be fed from the anterior air pipe 13 according to the boiler load while keeping the amount of air to be fed from the posterior air pipe 10 constant, the air 9 to be fed from the rear of a liquid discharge by the propeller 11 of the agitator 8 is atomized to fine bubbles by a shearing force resulting from a rotation of the propeller 11, and since this air 9 is constant, there is an effect that a constant air bubble dispersion distance and retention time in the recirculation tank section 7 can be maintained also for the air 9 to be fed to the front of a liquid discharge by the propeller 11.

Also, it is preferable to control the amount of air automatically by installing a flowmeter 14 and a flow control valve 15 in the posterior air pipe 10 and further installing a flowmeter 16 and a flow control valve 17 also in the anterior air pipe 13.

FIG. 3 is a chart of comparison in the ORP (oxidation-reduction potential) value in an absorbent liquid, in terms of oxidation of calcium sulfate in flue-gas desulfurization systems with specifications shown in Table 1 that treat the same amount of $SO_2$ to be removed and control an airflow in each of the air pipes 10 and 13, between when the oxidation air 9 was fed from the rear of a liquid discharge by the propeller 11 and when being fed from the front of a liquid discharge by the propeller 11 in a conventional art and when being fed from the rear of a liquid discharge by the propeller 11 and when being fed from the front of a liquid discharge by the propeller 11 in the present invention. Here, ORP indicates an oxidation state of the absorbent liquid, and the higher the ORP value, the higher oxidation efficiency of calcium sulfite becomes.

TABLE 1

| Amount of treated flue gas | 600,000 m³N/h |
|---|---|
| Inlet SO₂ concentration | 760 ppm |
| Number of oxidizing agitators | 3 |
| Oxidation air feeding position | Front and rear of propeller (Installation of air pipes at front and rear) |

In FIG. 3, when the oxidation air 9 was fed from the front of the propeller 11 to the recirculation tank section 7 ((2) in the figure), the air bubbles 12 were made to directly accompany a discharge flow resulting from a rotation of the propeller 11 so that the air bubble dispersion distance was increased and the retention time was increased, and thus in comparison with when the oxidation air 9 is fed to the recirculation tank section 7 from the rear of the propeller 11 ((1) in the figure) in the conventional art, the ORP value in the absorbent liquid was increased. In the method for feeding the oxidation air 9 to the recirculation tank section 7 of the propeller 11 from the rear and front of the propeller 11 of the present invention ((4) in the figure), when the same ratio was set for both the rear and front (50%:50%), in comparison with when the air 9 is fed only from the front of the propeller 11 ((2) in the figure), the ORP value in the absorbent liquid showed an almost equivalent result.

Moreover, a case where the ratio of the amount of air to be fed to the rear and front of the propeller 11 was set at 10% for the rear and 90% for the front ((3) in the figure) showed the highest ORP value. This is because, as is when the air 9 was fed at the same ratio (50%:50%) between the rear and front of the propeller 11 ((4) in the figure), if the ratio of the amount of air at the rear of the propeller 11 is increased more than at the front, the amount of air retained in the periphery of the rotating propeller 11 is increased, and as a result, the force of a liquid discharge by the rotating propeller 11 is lowered, and the dispersion distance of the air bubbles 12 made to accompany the liquid is reduced, whereby the retention time in the recirculation tank section 7 is reduced.

On the other hand, when the air 9 was fed at a ratio of 90% to the front of the propeller 11, and 10%, to the rear ((3) in the figure), since the amount of air to be fed from the rear of the propeller 11 was small, the force of an absorbent liquid discharge by the propeller 11 was slightly lowered, and thus the dispersion distance of the air bubbles 12 made to accompany the absorbent liquid and the retention time in the recirculation tank section 7 were not reduced. Moreover, the air 9 fed from the rear of the propeller 11 was atomized to fine bubbles by a shearing force of the rotating propeller 11 and the air 9 fed from the front of the propeller 11 was made to directly accompany a discharge flow from the rotating propeller 11 and the dispersion distance was increased, so that the retention time was increased. It can be understood that the ORP value in the absorbent liquid becomes highest due to both effects of the atomization of the air 9 to be fed and increase in the retention time in the recirculation tank section 7.

For improving oxidation efficiency of SO₂ in the absorbent liquid, the ratio of the amount of air to be fed to the rear and front of the propeller 11 is desirably made higher at the front than at the rear in the feeding ratio.

INDUSTRIAL APPLICABILITY

The present invention has high industrial applicability as a wet flue-gas desulfurization system and method with which even when the amount of oxidation air to be fed to the recirculation tank section is increased, highly efficient oxidation can be performed without increasing the number of agitators installed and the operating cost.

What is claimed is:

1. A wet flue-gas desulfurization system comprising:
an absorber shell including a flue gas inlet port through which a flue gas containing a sulfur oxide and soot and dust emitted from a combustion system is introduced and an absorbent liquid spray section provided at a higher portion than the flue gas inlet port; and
a recirculation tank section which stores an absorbent liquid that has absorbed a sulfur oxide in a flue gas and includes an agitator including a propeller to agitate the absorbent liquid, an air feeding means which blows oxidation air into a vicinity of the propeller, and an absorbent liquid recirculating means which extracts the absorbent liquid after an oxidation reaction by air and a neutralization reaction by alkali and recirculatively feeds the absorbent liquid to the absorbent liquid spray section of the absorber shell, wherein
the air feeding means is a means for feeding oxidation air to the absorbent liquid in the recirculation tank section at the rear and front of a liquid discharge by the propeller of the agitator.

2. The wet flue-gas desulfurization system according to claim 1, wherein, on the air feeding means, provided is a means for adjusting a ratio of the amount of air to be fed to the rear and front of a liquid discharge by the propeller of the agitator.

3. The wet flue-gas desulfurization system according to claim 1, wherein an air injection port of the air feeding means to be installed at the front of a liquid discharge by the propeller of the agitator is arranged at a position lower than an extended line of a horizontal central axis of the propeller.

4. A method for wet flue-gas desulfurization in which a ratio of the amount of air to be fed, by use of the wet flue-gas desulfurization system according to claim 1, wherein oxidation air to the absorbent liquid is fed in the recirculation tank section at the rear and front of a liquid discharge by the propeller of the agitator from the air feeding means and ratio of the amount of oxidation air to the rear and front of a liquid discharge by the propeller of the agitator is higher at the front of a liquid discharge than at the rear of a liquid discharge.

5. The method for wet flue-gas desulfurization according to claim 4, wherein, of a required amount of air, a ratio of the amount of air to be fed to the rear and front of a liquid discharge by the propeller of the agitator is 10% at the rear of a liquid discharge and 90% at the front of a liquid discharge.

6. The method for wet flue-gas desulfurization according to claim 4, wherein when the oxidation air to be fed to the air feeding means is changed in amount, of a required amount of air, an amount of air to be fed to the rear of a liquid discharge by the propeller of the agitator is kept constant, and an amount of air to be fed to the front of a liquid discharge by the propeller of the agitator is changed.

* * * * *